(12) United States Patent
Park et al.

(10) Patent No.: US 11,574,641 B2
(45) Date of Patent: Feb. 7, 2023

(54) METHOD AND DEVICE WITH DATA RECOGNITION

(71) Applicant: SAMSUNG ELECTRONICS CO., LTD., Suwon-si (KR)

(72) Inventors: Sung-Un Park, Suwon-si (KR); Kyuhong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 16/845,464

(22) Filed: Apr. 10, 2020

(65) Prior Publication Data

US 2020/0388286 A1 Dec. 10, 2020

(30) Foreign Application Priority Data

Jun. 7, 2019 (KR) .................. 10-2019-0067363

(51) Int. Cl.
| | |
|---|---|
| *G10L 17/18* | (2013.01) |
| *G10L 17/02* | (2013.01) |
| *G06K 9/62* | (2022.01) |
| *G10L 17/08* | (2013.01) |
| *G10L 17/06* | (2013.01) |
| *G06N 3/08* | (2006.01) |
| *G06V 10/46* | (2022.01) |
| *G06V 40/16* | (2022.01) |
| *G06F 21/32* | (2013.01) |

(52) U.S. Cl.
CPC ............ *G10L 17/18* (2013.01); *G06K 9/6201* (2013.01); *G06K 9/627* (2013.01); *G06K 9/6232* (2013.01); *G06N 3/08* (2013.01); *G06V 10/469* (2022.01); *G06V 40/172* (2022.01); *G10L 17/02* (2013.01); *G10L 17/06* (2013.01); *G10L 17/08* (2013.01); *G06F 21/32* (2013.01)

(58) Field of Classification Search
CPC ......... G10L 17/18; G10L 17/06; G10L 17/08; G10L 17/02; G06K 9/481; G06K 9/6201; G06K 9/6232; G06K 9/627; G06K 9/00288; G06N 3/08; G06F 21/32
USPC ....................................................... 704/232
See application file for complete search history.

(56) References Cited

U.S. PATENT DOCUMENTS

| | | | | |
|---|---|---|---|---|
| 6,067,517 A | * | 5/2000 | Bahl ................. | G10L 15/20 |
| | | | | 704/256.4 |
| 6,182,037 B1 | * | 1/2001 | Maes ................. | G10L 17/06 |
| | | | | 704/E17.007 |

(Continued)

FOREIGN PATENT DOCUMENTS

| | | |
|---|---|---|
| CN | 108173871 A | 6/2018 |
| JP | 2003-256429 A | 9/2003 |

(Continued)

*Primary Examiner* — Edwin S Leland, III
(74) *Attorney, Agent, or Firm* — NSIP Law

(57) ABSTRACT

A processor-implemented method with data recognition includes: extracting input feature data from input data; calculating a matching score between the extracted input feature data and enrolled feature data of an enrolled user, based on the extracted input feature data, common component data of a plurality of enrolled feature data corresponding to the enrolled user, and distribution component data of the plurality of enrolled feature data corresponding to the enrolled user; and recognizing the input data based on the matching score.

26 Claims, 12 Drawing Sheets

(56) References Cited

U.S. PATENT DOCUMENTS

| | | | |
|---|---|---|---|
| 6,671,666 B1* | 12/2003 | Ponting | G10L 15/065 704/E15.01 |
| 10,693,872 B1* | 6/2020 | Larson | H04L 63/0838 |
| 2014/0050372 A1* | 2/2014 | Qi | G06V 40/172 382/118 |
| 2015/0235073 A1* | 8/2015 | Hua | G06V 10/764 382/118 |
| 2015/0302856 A1* | 10/2015 | Kim | G10L 15/22 704/273 |
| 2016/0005422 A1* | 1/2016 | Zad Issa | H03G 3/32 704/226 |
| 2016/0191517 A1* | 6/2016 | Bae | A61B 5/117 726/7 |
| 2016/0293167 A1* | 10/2016 | Chen | H04N 21/23476 |
| 2020/0388286 A1* | 12/2020 | Park | G06V 10/469 |
| 2021/0125617 A1* | 4/2021 | Park | G10L 17/04 |

FOREIGN PATENT DOCUMENTS

| | | |
|---|---|---|
| JP | 2005-250562 A | 9/2005 |
| JP | 2007-188190 A | 7/2007 |
| KR | 10-2016-0082081 A | 7/2016 |

\* cited by examiner

METHOD AND DEVICE WITH DATA RECOGNITION

CROSS-REFERENCE TO RELATED APPLICATIONS

This application claims the benefit under 35 USC § 119(a) of Korean Patent Application No. 10-2019-0067363 filed on Jun. 7, 2019 in the Korean Intellectual Property Office, the entire disclosure of which is incorporated herein by reference for all purposes.

BACKGROUND

1. Field

The following description relates to technology for recognizing data.

2. Description of Related Art

Recently, technological automation of recognition has been implemented through processor implemented neural network models, as specialized computational architectures, that, after substantial training, may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern for which the neural network may not have been trained, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with data recognition includes: extracting input feature data from input data; calculating a matching score between the extracted input feature data and enrolled feature data of an enrolled user, based on the extracted input feature data, common component data of a plurality of enrolled feature data corresponding to the enrolled user, and distribution component data of the plurality of enrolled feature data corresponding to the enrolled user; and recognizing the input data based on the matching score.

The common component data may include a mean feature vector having an entry corresponding to a mean value of entries with a same index, among entries of the plurality of enrolled feature data, for each index among indices. The distribution component data may include a variance feature vector having an entry corresponding to a variance value of the entries with the same index, among the entries of the plurality of enrolled feature data, for each index.

The calculating of the matching score may include calculating a partial score as the matching score from at least one entry of the extracted input feature data, at least one entry of the common component data, and at least one entry of the distribution component data.

The calculating of the partial score may include: calculating an entry score in a target index based on an entry corresponding to the target index in the extracted input feature data, an entry corresponding to the target index in the common component data, and an entry corresponding to the target index in the distribution component data; and calculating the partial score by accumulating the entry score in the target index to an entry score in at least one other index.

The accumulating of the entry score in the target index to the entry score in the at least one other index may include adding the entry score in the target index to the entry score in the at least one other index.

The extracted input feature data, the common component data, and the distribution component data may include dimension vectors with a same dimension. The recognizing of the input data may include recognizing the input data based on a partial score calculated with respect to a portion of indices of the dimension, before scores with respect to all the indices of the dimension are calculated.

The recognizing of the input data may include: determining whether a recognition based on the input data is successful, based on a result of comparing the partial score to a partial success threshold level; or determining whether the recognition based on the input data is failed, based on a result of comparing the partial score to a partial failure threshold level.

The recognizing of the input data may include allowing an access to a device, in response to determining that a user indicated by the input data matches the enrolled user.

The calculating of the matching score may include: loading a representative mean vector and a representative variance vector corresponding to each of a plurality of groups, from an enrollment database storing a plurality of enrolled vector data clustered into the plurality of groups; identifying a group to which the extracted input feature data is matched, among the plurality of groups, based on the extracted input feature data, the representative mean vector, and the representative variance vector; and determining whether the input data matches enrolled vector data belonging to the identified group. The plurality of enrolled vector data may each include common component data and distribution component data.

The receiving of the input data may include receiving an input image from a user as the input data. The extracting of the input feature data may include extracting the input feature data from the input image. The recognizing of the input data may include determining whether an object in the input image corresponds to the enrolled user based on the matching score.

The receiving of the input data may include receiving a voice signal from a speaker as the input data. The extracting of the input feature data may include extracting the input feature data from the voice signal. The recognizing of the input data may include determining whether the speaker of the voice signal corresponds to the enrolled user based on the matching score.

In another general aspect, a non-transitory computer-readable storage medium stores instructions that, when executed by a processor, cause the processor to perform the method described above.

In another general aspect, a device with data recognition includes: an inputter configured to receive input data; and one or more processors configured to: extract input feature data from the input data; calculate a matching score between the extracted input feature data and enrolled feature data of an enrolled user, based on the extracted input feature data, common component data of a plurality of enrolled feature data corresponding to the enrolled user, and distribution component data of the plurality of enrolled feature data corresponding to the enrolled user; and recognize the input data based on the matching score.

The one or more processors may be further configured to calculate a partial score as the matching score from at least one entry of the extracted input feature data, at least one entry of the common component data, and at least one entry of the distribution component data.

The one or more processors may be further configured to calculate an entry score in a target index based on an entry corresponding to the target index in the extracted input feature data, an entry corresponding to the target index in the common component data, and an entry corresponding to the target index in the distribution component data, and calculate the partial score by accumulating the entry score in the target index to an entry score in at least one other index.

The accumulating of the entry score in the target index to the entry score in the at least one other index may include adding the entry score in the target index to the entry score in the at least one other index.

The extracted input feature data, the common component data, and the distribution component data may include dimension vectors with the same dimension. The one or more processors may be further configured to recognize the input data based on a partial score calculated with respect to a portion of indices of the dimension, before scores with respect to all the indices of the dimension are calculated.

The one or more processors may be further configured to determine whether a recognition based on the input data is successful, based on a result of comparing the partial score to a partial success threshold level, or determine whether the recognition based on the input data is failed, based on a result of comparing the partial score to a partial failure threshold level.

The one or more processors may be further configured to allow an access to a device, in response to a determination that a user indicated by the input data matches the enrolled user.

The device may further include: a memory storing an enrollment database including a plurality of enrolled vector data clustered into a plurality of groups. The plurality of enrolled vector data may each include common component data and distribution component data. The one or more processors may be further configured to: load a representative mean vector and a representative variance vector corresponding to each of the plurality of groups from the memory; identify a group to which the extracted input feature data is matched, among the plurality of groups, based on the extracted input feature data, the representative mean vector, and the representative variance vector; and determine whether the input data matches enrolled vector data belonging to the identified group.

The one or more processors may include: a neural processing unit (NPU) configured to extract the input feature data; and a main processor configured to calculate the matching score from the extracted input feature data, the common component data, and the distribution component data upon receiving the input feature data, the common component data, and the distribution component data from the NPU.

The one or more processors may include: a digital signal processor (DSP) configured to detect target data from the input data; and a main processor configured to extract the input feature data from the target data.

The inputter may include either one of a camera configured to receive an input image as the input data and a microphone configured to receive an input voice as the input data.

In another general aspect, a processor-implemented method with data recognition includes extracting input feature data from input data; calculating a partial matching score between the extracted input feature data and enrolled feature data of an enrolled user, based on the extracted input feature data, a portion of common component data of a plurality of enrolled feature data corresponding to the enrolled user, and a portion of distribution component data of the plurality of enrolled feature data corresponding to the enrolled user; and recognizing the input data based on the partial matching score. The portion of the common component data is less than an entirety of entries of the common component data, and the portion of the distribution component data is less than an entirety of entries of the distribution component data.

The extracted input feature data may include an input feature vector. The common component data may include a mean feature vector. The distribution component data may include a variance feature vector.

The recognizing of the input data may include determining whether a user inputting the input data corresponds to the enrolled user based on the partial matching score.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
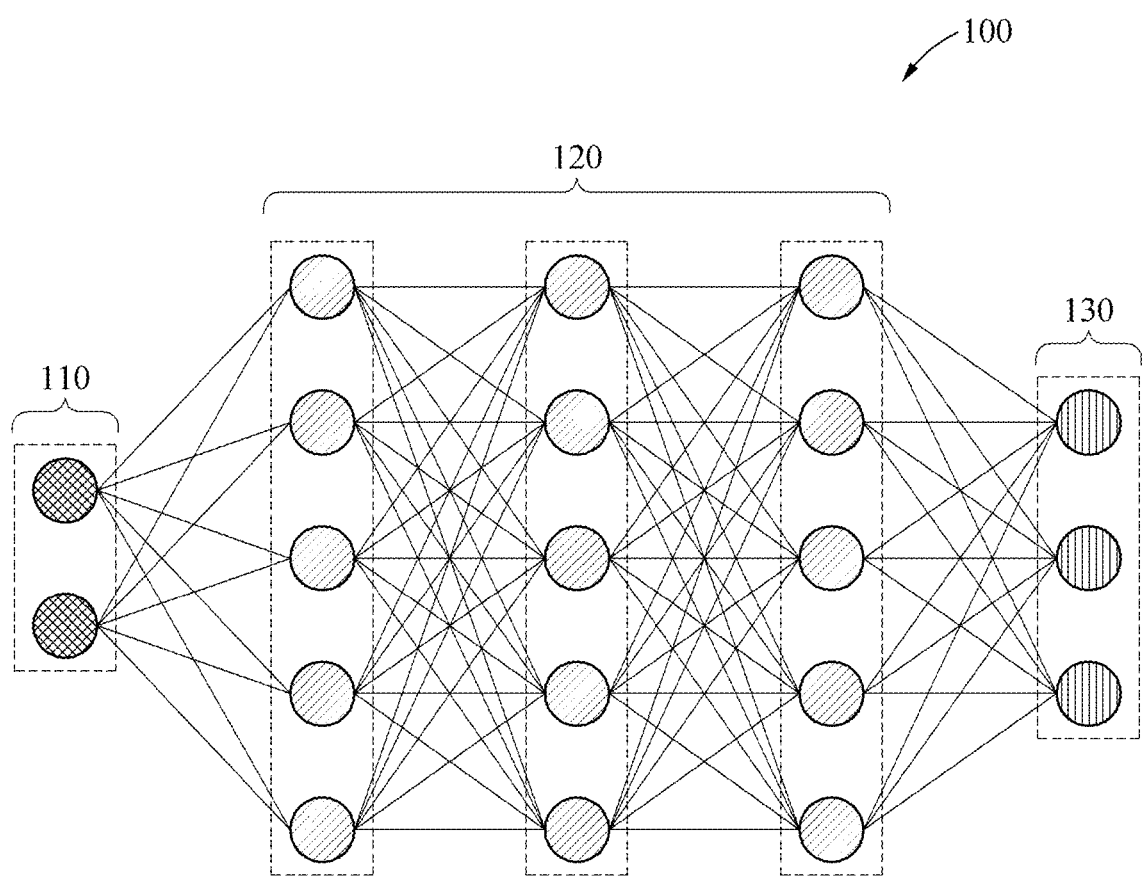
FIG. 1 illustrates an example of a feature extraction model.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which examples belong after an understanding of the disclosure of this application. It will be further understood that terms, such as those defined in commonly-used dictionaries, should be interpreted as having a meaning that is consistent with their meaning in the context of the relevant art and the disclosure of this application, and will not be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a feature extraction model.

A data recognition device may recognize a user using feature data extracted from an input image. For example, the data recognition device extracts the feature data from the input image based on a feature extraction model. The feature data may be abstracted data of the image, for example, in a form of a vector. The feature extraction model is a model provided in a machine learning structure and configured to extract feature data from an image, for example. Referring to FIG. 1, the feature extraction model may include a neural network 100, for example.

The neural network 100 is an example of a deep neural network (DNN). The DNN may include a fully connected network, a deep convolutional network, or a recurrent neural network, for example. The neural network 100 may perform object classification, object recognition, voice recognition, and/or image recognition by mapping input data and output data having a non-linear relationship to each other based on deep learning. Deep learning is a machine learning technique to solve a problem such as image or voice recognition from a large dataset. Deep learning maps the input data and the output data through supervised or unsupervised learning.

As noted above, although the feature extraction model of FIG. 1 is described as including the neural network 100, in other examples, a feature extraction model applicable to this disclosure may include other types of neural networks. For example, the example recurrent neural network (RNN), the example fully connected neural network, other example convolutional neural networks, a bi-directional neural network, a restricted Boltzmann machine, or a neural network including different or overlapping neural network portions respectively with full, convolutional, recurrent, and/or bi-directional connections may be included in a feature extraction model, as non-limiting examples.

Herein, "recognition" may include data verification and/or data identification. Additionally, "verification" may include an operation of determining whether input data is true or false. For example, verification may be a determination operation of determining whether an object, for example, a human face, indicated by a predetermined input image is the same as an object indicated by a reference image. The data recognition device may verify whether data extracted and obtained from an input image is the same as enrollment data enrolled in advance in the device, and determine that verification with respect to a user corresponding to the input image is successful in response to verification that the extracted and obtained data and the enrollment data are the same. However, the disclosure is not limited to the foregoing example. When a plurality of enrollment data are stored in the data recognition device, the data recognition device may sequentially verify the data extracted and obtained from the input image with respect to each of the plurality of enrollment data.

Herein, "identification" may be a classification operation of determining a label indicated by input data, among a plurality of labels. Each label may indicate a class, for example, an identity (ID) of an enrolled user. For example, the identification operation may provide an indication of whether a user included in input data is male or female.

Referring to FIG. 1, the neural network 100 includes an input layer 110, hidden layers 120, and an output layer 130. The input layer 110, the hidden layers 120 and the output layer 130 may each include a plurality of artificial nodes.

For ease of description, FIG. 1 illustrates the neural network 100 including three hidden layers 120. However, the number of hidden layers 120 may vary. Further, FIG. 1 illustrates the neural network 100 including a separate input layer to receive input data. However, the input data may be input directly into a hidden layer 120. In the neural network 100, artificial nodes of layers excluding the output layer 130 are connected to artificial nodes of a subsequent layer through connections or links to transmit respective output signals. The number of connections or links corresponds to the number of artificial nodes included in the subsequent layer.

Outputs of an activation function related to weighted inputs of artificial nodes included in a previous layer of the hidden layers 120 are input into artificial nodes included in a subsequent layer of the hidden layers 120. The weighted inputs are obtained by multiplying respective weights to outputs from the artificial nodes included in the previous layer. The weights are parameters of the neural network 100. The activation function may include a sigmoid function, a hyperbolic tangent (tan h) function, and a rectified linear unit (ReLU) function. Such activation functions are used to form a non-linearity of the neural network 100. The weighted outputs from the artificial nodes included in the last hidden layer 120 are input into the artificial nodes included in the output layer 130.

The neural network 100 identifies the input data. For example, when input data is provided, the neural network 100 calculates function values based on the number of trained classes to be identified by the output layer 130 through the hidden layers 120, and identifies the input data with a class having a greatest value or probability among the function values. However, the disclosure is not limited to such an example. The neural network 100 can thus be used for verifying the input data with respect to reference data, for example, enrolled or registration data. The following description related to the recognition process will be directed to the verification process. However, the following description may also apply to the identification process, with the exception of portions departing from the nature of the identification process.

When the width and the depth of the neural network 100 are sufficiently great, the neural network 100 may have a capacity sufficient to implement a predetermined trained objective or function. When the neural network 100 learns a sufficient quantity of training data through an appropriate training process, e.g., through gradient based back propagation, the neural network 100 may achieve an optimal or efficient recognition performance.

The neural network 100 has been described above as an example of the feature extraction model. However, the feature extraction model is not limited to the neural network 100. Hereinafter, a verification operation performed based on feature data extracted using the feature extraction model will be primarily described, while again noting that alternative examples are possible.

Figure 2:
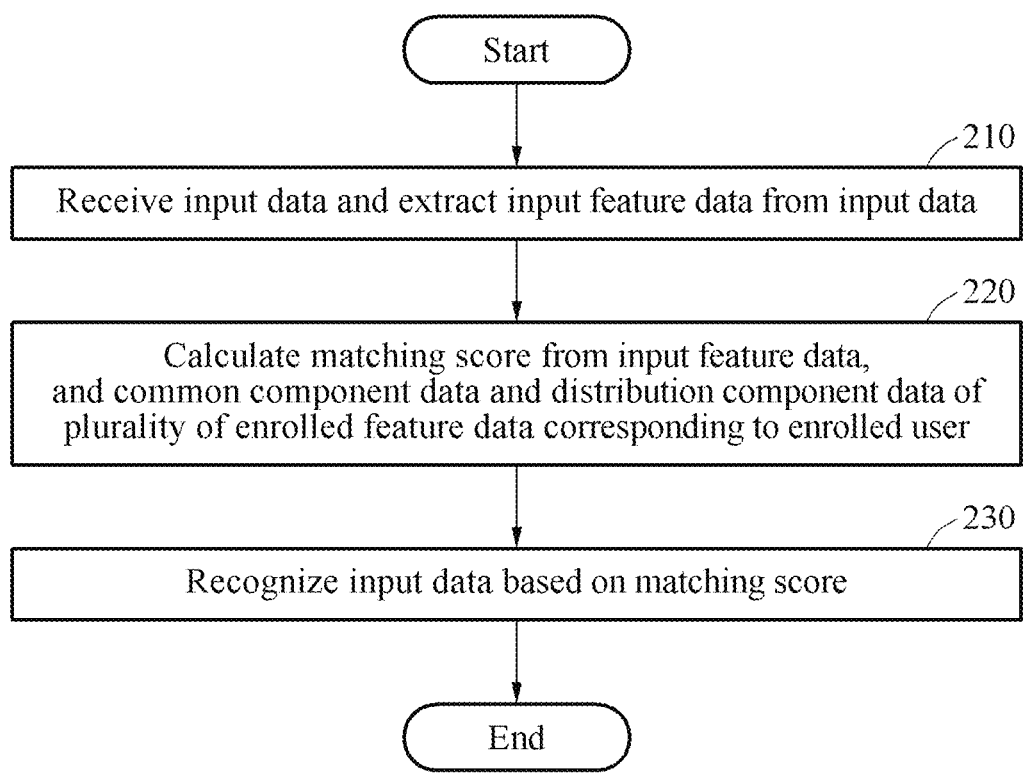
FIG. 2 illustrates an example of a data recognition method.

FIG. 2 illustrates an example of a data recognition method.

Referring to FIG. 2, first, in operation 210, a data recognition device receives input data and extracts input feature data from the input data. The data recognition device extracts the input feature data from the input data based on a feature extraction model. The feature extraction model is, for example, the trained neural network 100 described above with reference to FIG. 1. When the input feature data is data in a form of a vector, the input feature data is also referred to as an input feature vector. The input data is, for example, an image and/or a voice signal input from a user. The input data may also be in the form of a volume.

In operation 220, the data recognition device calculates a matching score from comparing the input feature data and information of an enrolled user, including common component data and distribution component data of a plurality of enrolled feature data corresponding to an enrolled user. Thus, the data recognition device loads, from an enrollment database stored in a memory, common component data and distribution component data corresponding to a predetermined enrolled user. The data recognition device calculates the matching score from the loaded common component data, the loaded distribution component data, and the input feature data extracted in operation 210.

Herein, the common component data is, for example, data indicating a common component of the plurality of enrolled feature data corresponding to the same enrolled user. For example, the common component data indicates information related to a common component that is maintained uniformly in various environments from a facial image and/or a voice signal of the corresponding enrolled user. The distribution component data is data indicating a distribution component of the plurality of enrolled feature data corresponding to the same enrolled user. The distribution component data indicates information related to a distribution which uniquely changes depending on a characteristic of the corresponding enrolled user. For reference, the common component data may be a mean feature vector, and the distribution component data may be a variance feature vector. The mean feature vector and the variance feature vector will be described below, with reference to FIG. 4, along with calculation of a matching score.

In operation 230, the data recognition device recognizes the input data based on the matching score. For example, the data recognition device calculates a similarity between the input data and the enrolled data (hereinafter "similarity") as the matching score, and determines that an object indicated by the input data matches the enrolled user in response to the similarity exceeding a threshold similarity level. Conversely, in response to the similarity being less than or equal to the threshold similarity level, the data recognition device determines that the object indicated by the input data does not match the enrolled user. However, the disclosure is not limited to the foregoing examples. For example, the data recognition device may calculate, as the matching score, a value indicating a difference level between two data, for example, two vectors, such as a Euclidean distance value. In this example, the data recognition device determines that the object indicated by the input data matches the enrolled user in response to the calculated Euclidean distance value being less than or equal to a threshold distance level. Conversely, in response to the calculated distance value exceeding the threshold distance level, the data recognition device determines that the object indicated by the input data does not match the enrolled user.

The data recognition device calculates the matching score with respect to the input feature data using both the common component data and the distribution component data, thereby achieving a more accurate recognition rate with respect to the enrolled user than recognition methods in which only the common component data is considered. Furthermore, the data recognition device calculates a partial matching score, hereinafter, a partial score, with respect to a portion of entries of feature vectors, unlike the scheme of calculating a cosine similarity with respect to two vectors. The data recognition device recognizes a user based on the partial score, thereby generating a result of recognizing the input user more quickly without a delay.

Figure 3:
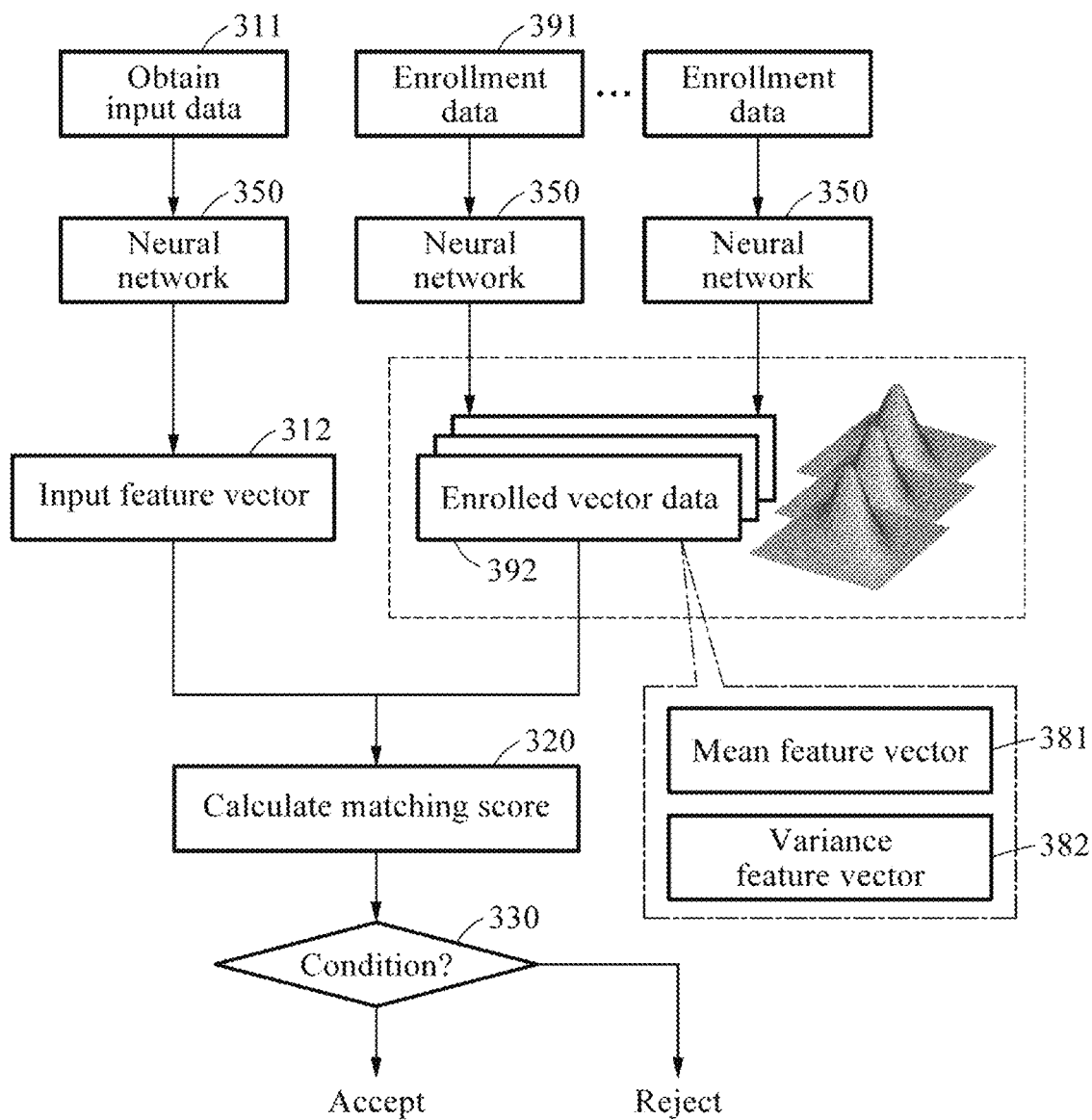
FIG. 3 illustrates an example process of recognizing data.

FIG. 3 illustrates an example process of recognizing data.

Referring to FIG. 3, first, a data recognition device establishes an enrollment database based on enrollment data 391 obtained from a user. Herein, the enrollment data 391 is data obtained from a user to be enrolled, for example, data indicating an image acquired by capturing a body part, for example, a face, of the user to be enrolled and/or a voice of the user to be enrolled.

The data recognition device generates enrolled vector data 392 from the enrollment data 391, i.e., using the feature extraction model, and stores the enrolled vector data 392 in the enrollment database. For example, the enrolled vector data 392 includes a mean feature vector 381 and a variance feature vector 382.

The data recognition device obtains a plurality of enrolled feature vectors to calculate the mean feature vector 381 and the variance feature vector 382. For example, the data recognition device obtains the plurality of enrollment data 391 to generate the plurality of enrolled feature vectors. In an enrollment process, the data recognition device requests the user to input the plurality of enrollment data 391, or obtains the plurality of enrollment data 391 from the user. For example, the data recognition device obtains a plurality of voice signals to be enrolled from the user by requesting the same user to utter a plurality of voices to be enrolled. In another example, the data recognition device obtains a plurality of images to be enrolled by capturing a body part of the user a number of times. The data recognition device extracts, using a neural network 350, an enrolled feature vector from each of the plurality of enrollment data 391 obtained as described above. The neural network 350 may correspond to the neural network 100 illustrated in FIG. 1, for example.

The data recognition device thus stores the mean feature vector 381 and the variance feature vector 382, among the plurality of enrolled feature vectors for extracted features for the user. The mean feature vector 381 indicates a mean value of entries of the plurality of enrolled feature vectors, and the variance feature vector 382 indicates a variance value of the entries, which will be described further below with reference to FIG. 4. Thus, the enrolled vector data 392 including the mean feature vector 381 and the variance feature vector 382 exhibits a distribution tendency of the enrolled feature vectors.

The number of enrolled feature vectors used to generate the mean feature vector 381 and the variance feature vector 382 may vary in different examples. For example, the data recognition device may or may not generate the same number of enrolled feature vectors for each enrollment. The data recognition device may adjust the quantity of the enrollment data 391 obtained from the user during the enrollment process, for example. In addition, although FIG. 3 illustrates, for ease of description, an example of generating the mean feature vector 381 and the variance feature vector 382 from a series of enrollment data 391 obtained through a single enrollment process, examples are not limited thereto. In a case of enrollment data 391 indicating a user the same as the user of the existing enrollment data 391, the enrollment data 391 and the existing enrollment data 391 may be used together to generate the mean feature vector 381 and the variance feature vector 382 even when the enrollment data 391 and the existing enrollment data 391 are obtained at different times.

When the enrollment database is established, the data recognition device obtains input data to be recognized from a user, in operation 311. The data recognition device extracts an input feature vector 312 from the input data using the neural network 350.

In operation 320, the data recognition device calculates a matching score from the input feature vector 312 and the enrolled vector data 392. The matching score is a score indicating a level of matching between an object determined or represented by the input data and an enrolled user. Herein, the matching score may be a similarity. However, the disclosure is not limited to such an example. For example, the matching score may be a distance value for improvement in a computing rate. An example of calculating the matching score will be described in greater detail further below with reference to FIG. 4.

In operation 330, the data recognition device determines whether the matching score satisfies a condition. The data recognition device determines whether a recognition of the input data is successful or has failed based on a result of comparing the matching score to a threshold value. For example, the data recognition device may permit the user access to the device or an area in response to the recognition of the input data being successful. Conversely, the data recognition device may reject an access of the user to the device or the area in response to the recognition of the input data being failed. In this example, when a matching score calculated from enrolled vector data 392 and an input feature vector 312 corresponding to a predetermined enrolled user does not satisfy the condition, the data recognition device may attempt a verification with respect to another enrolled user. The data recognition device may calculate matching scores of operation 320 from enrolled vector data 392 and input feature vectors 312 corresponding to a plurality of enrolled users stored in the enrollment database, and may determine whether the matching scores satisfy the condition of operation 330. When all the matching scores calculated with respect to all the enrolled users do not satisfy the condition of operation 330, the data recognition device may determine that the recognition is finally failed, and restrict the access of the user.

In the example of FIG. 3, the neural network 350 applied to the input data and the neural network 350 applied to the enrollment data 391 may have the same trained structure and parameters, e.g., they may be the same neural network or model.

Figure 4:
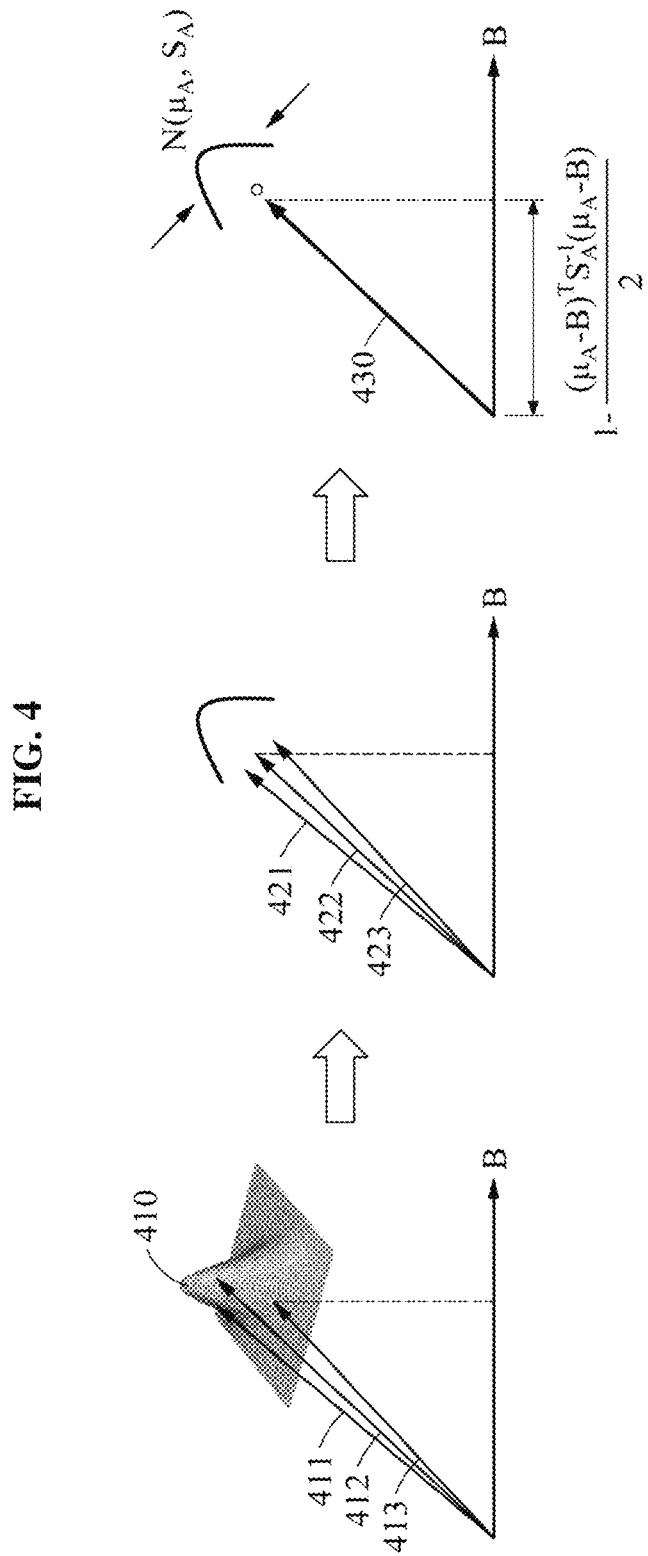
FIG. 4 illustrates an example of common component data and distribution component data.

FIG. 4 illustrates an example of common component data and distribution component data.

Referring to FIG. 4, first, to calculate enrolled vector data 430, a data recognition device extracts enrolled feature vectors 411, 412, and 413 from enrollment data. In FIG. 4, an example in which the data recognition device extracts the three enrolled feature vectors 411, 412, and 413 respectively from three pieces of enrollment data is described. The enrolled feature vectors 411, 412, and 413 represent a predetermined distribution 410 with respect to a predetermined reference vector. For reference, in FIG. 4, the reference vector is depicted as an input feature vector B. However, the disclosure is not limited to this example.

The data recognition device generates normalized vectors 421, 422, and 423 by normalizing the extracted enrolled feature vectors 411, 412, and 413, respectively. For example, the data recognition device normalizes the enrolled feature vectors 411, 412, and 413 by dividing the enrolled feature vectors 411, 412, and 413 by absolute values thereof. Thus, magnitudes of the normalized feature vectors 421, 422, and 423 may be limited to "1". However, the magnitudes of the normalized feature vectors 421, 422, and 423 are not limited to "1". In various examples, the normalized feature vectors 421, 422, and 423 may have different magnitudes, such as by multiplying, by a predetermined constant, values obtained by dividing the enrolled feature vectors 411, 412, and 413 by the respective absolute values thereof.

In the example of FIG. 4, a set A of the normalized vectors 421, 422, and 423 with respect to the same object, for example, the same user, is expressed by Equation 1, and the normalized feature vectors 421, 422, and 423 constituting the set A are expressed by Equation 2.

$$A = \{A_1, A_2, \ldots, A_m\} \quad \text{Equation 1:}$$

$$A_1 = [a_{1,1}, a_{1,2}, \ldots, a_{1,n-1}, a_{1,n}] \quad \text{Equation 2:}$$

$$\ldots$$

$$A_j = [a_{j,1}, a_{j,2}, \ldots, a_{j,n-1}, a_{j,n}]$$

$$\ldots$$

$$A_m = [a_{m,1}, a_{m,2}, \ldots, a_{m,n-1}, a_{m,n}]$$

In Equation 1, m is the number of the normalized feature vectors 421, 422, and 423, and is an integer greater than or equal to "1". In the example of FIG. 4, m is "3". Further, in Equation 2, n is a dimension of a normalized feature vector, and is an integer greater than or equal to "1". In Equation 2, $A_j$ is a j-th normalized feature vector, and j is an integer greater than or equal to "1" and less than or equal to m. $a_{j,i}$ is a value of an i-th entry of the j-th normalized feature vector, and i is an index indicating a predetermined entry of a feature vector, and is an integer greater than or equal to "1" and less than or equal to n. For reference, Equations 1 and 2 describe an example in which feature vectors are normalized feature vectors. However, the disclosure is not limited to these examples. For example, Equations 1 and 2 may also apply to unnormalized feature vectors.

The data recognition device generates enrolled vector data from the normalized feature vectors 421, 422, and 423. Each enrolled vector data may include both common component data and distribution component data, as described above.

The common component data is data indicating a common component of a plurality of enrolled feature data corresponding to the same object, and includes, for example, a mean feature vector having an entry corresponding to a mean value of entries with the same index, among entries of the plurality of enrolled feature vectors, for each index. The mean feature vector is expressed by Equation 3. The entries of the mean feature vector are expressed by Equation 4.

$$\mu_A = [\mu_{a,1}, \mu_{a,2}, \ldots, \mu_{a,n-1}, \mu_{a,n}] \quad \text{Equation 3:}$$

$$\mu_{a,i} = \text{Mean}(a_{1,i}, \ldots, a_{j,i}, \ldots, a_{m,i}) \quad \text{Equation 4:}$$

In Equation 3, $\mu_A$ is a mean feature vector of the normalized feature vectors 421, 422, and 423 constituting the feature distribution 410 with respect to the same object. Each entry of the mean feature vector $\mu_A$ is a mean value of entries with the same index in the normalized feature vectors 421, 422, and 423, as described above. Equation 4 illustrates that an i-th entry $\mu_{a,i}$ of the mean feature vector $\mu_A$ is a mean value of entry values corresponding to an i-th index of the normalized feature vectors 421, 422, and 423. Mean( ) is a function to calculate a mean.

The distribution component data is data indicating a distribution component of the plurality of enrolled feature data corresponding to the same object, and includes, for example, a variance feature vector having an entry corresponding to a variance value of the entries with the same index in the plurality of enrolled feature vectors, for each index. The variance feature vector is expressed by Equation 5. The entries of the variance feature vector are expressed by Equation 6.

$$S_A = [S_{a,1}, S_{a,2}, \ldots, S_{a,n-1}, S_{a,n}] \quad \text{Equation 5:}$$

$$S_{a,i} = \text{Var}(a_{1,i}, \ldots, a_{j,i}, \ldots, a_{m,i}) \quad \text{Equation 6:}$$

In Equation 5, $S_A$ is a variance feature vector of the normalized feature vectors 421, 422, and 423 constituting the feature distribution 410 with respect to the same object. Each entry of the variance feature vector $S_A$ is a variance value of entries with the same index in the normalized feature vectors 421, 422, and 423, as described above. However, the disclosure herein is not limited this example. The data recognition device extracts feature vectors from a variety of data originated from the same speaker or different speakers, and generates a variance feature vector by calculating a variance value of entries of the extracted feature vectors in advance, and uses the same variance feature vector generated in this manner for the same speaker or the different speakers in common. Equation 6 illustrates that an i-th entry $S_{a,i}$ of the variance feature vector $S_A$ is a variance value of entries corresponding to the i-th index of the normalized feature vectors 421, 422, and 423. Var( ) is a function to calculate a variance.

The enrolled vector data 430 including the mean feature vector $\mu_A$ and the variance feature vector $S_A$ calculated based on Equations 3 and 5 is information representing the feature distribution 410 and the set A. In FIG. 4, the enrolled vector data 430 is conceptually depicted as a single vector to describe the matching score, only for better understanding. In practice, the enrolled vector data 430 includes the mean feature vector $\mu_A$ and the variance feature vector $S_A$.

The data recognition device calculates a matching score using the input feature vector B, with respect to the mean feature vector $\mu_A$ and the variance feature vector $S_A$ described above. The input feature vector B is expressed by Equation 7.

$$B = [b_1, b_2, \ldots, b_{n-1}, b_n] \quad \text{Equation 7:}$$

For example, the data recognition device calculates, as the matching score, a similarity as expressed by Equations 8 through 13 from the mean feature vector $\mu_A$, the variance feature vector $S_A$, and the input feature data B.

$$\text{similarity} = 1 - \frac{1}{2}\text{Dist}(A, B)^2 = 1 - \frac{(\mu_A - B)^T S_A^{-1} (\mu_A - B)}{2} \quad \text{Equation 8:}$$

$$1 - \frac{1}{2}\sum_{i=1}^{n} \frac{(\mu_{Ai} - B_i)^2}{S_{Ai}} \quad \text{Equation 9:}$$

$$1 - \sum_{i=1}^{n} \frac{(\mu_{Ai} - B_i)^2}{2 S_{Ai}} \quad \text{Equation 10:}$$

$$1 - \sum_{i=1}^{n} \frac{|\mu_{Ai} - B_i|}{2 S_{Ai}} \quad \text{Equation 11:}$$

$$1 - \sum_{i=1}^{n} \frac{|\mu_{Ai} - B_i|}{S_{Ai}} \quad \text{Equation 12:}$$

$$\sqrt{\sum_{i=1}^{n} \frac{(\mu_{Ai} - B_i)^2}{S_{Ai}}} \quad \text{Equation 13:}$$

In Equation 8, $\text{Dist}(A,B)^2$ is a function to calculate a distance value between the input feature vector B and enrolled vector data 520 (see FIG. 5) corresponding to the set A of enrolled feature vectors. $(\mu_A - B)^T$ is a result of transposing $(\mu_A - B)$. $S_A^{-1}$ is an inversion of the variance feature vector $S_A$. In Equation 8, the term expressed as a matrix operation is a sum of values obtained by dividing the square of a difference between an i-th entry $\mu_{Ai}$ of the mean feature vector $\mu_A$ and an i-th entry $B_i$ of the input feature vector B by an i-th entry $S_{Ai}$ of the variance feature vector $S_A$, and is expressed by $$\sum_{i=1}^{n} \frac{(\mu_{Ai} - B_i)^2}{S_{Ai}}.$$

For example, this term is expressed by Equation 9. For reference, the data recognition device may use the similarity of Equation 8 as the matching score. However, the disclosure herein is not limited to this example. The data recognition device may also use the distance value Dist(A,B)$^2$ as the matching score. In this example, the data recognition device omits an operation of subtraction from "1", and calculates only $$\frac{(\mu_A - B)^T S_A^{-1}(\mu_A - B)}{2},$$

whereby the computing rate relatively improves. In addition, like the score described in Equation 10 through Equation 13, the portions divided by "2" may all be omitted to improve the computing rate, or a matching score using an absolute value instead of the square may be used. Hereinafter, for ease of description, examples will be described primarily based on Equation 8. However, the disclosure herein is not limited to these examples.

The data recognition device calculates scores for respective entries by calculating a matching score between the input feature vector B and the set A of enrolled feature vectors, in view of the mean feature vector $\mu_A$ and the variance feature vector $S_A$, as expressed by Equation 8. Since the data recognition device calculates a partial score while accumulating the scores calculated for respective entries, the data recognition device recognizes the input data using plural partial scores before all matching scores are calculated. Thus, the data recognition device more quickly determines whether an object indicated by the input data matches an enrolled user. In other words, the data recognition device determines whether a predetermined threshold condition set for allowing an access, for example, unlocking a screen, is satisfied during a calculation, or whether the predetermined threshold condition is unreachable even when the calculation is performed further, thereby determining a result in advance before matching scores with respect to all indices constituting a dimension of a feature vector are calculated.

Example processes of calculating scores for respective entries and calculating a partial score therefrom will be described with reference to FIGS. 5 and 6.

Figure 5:
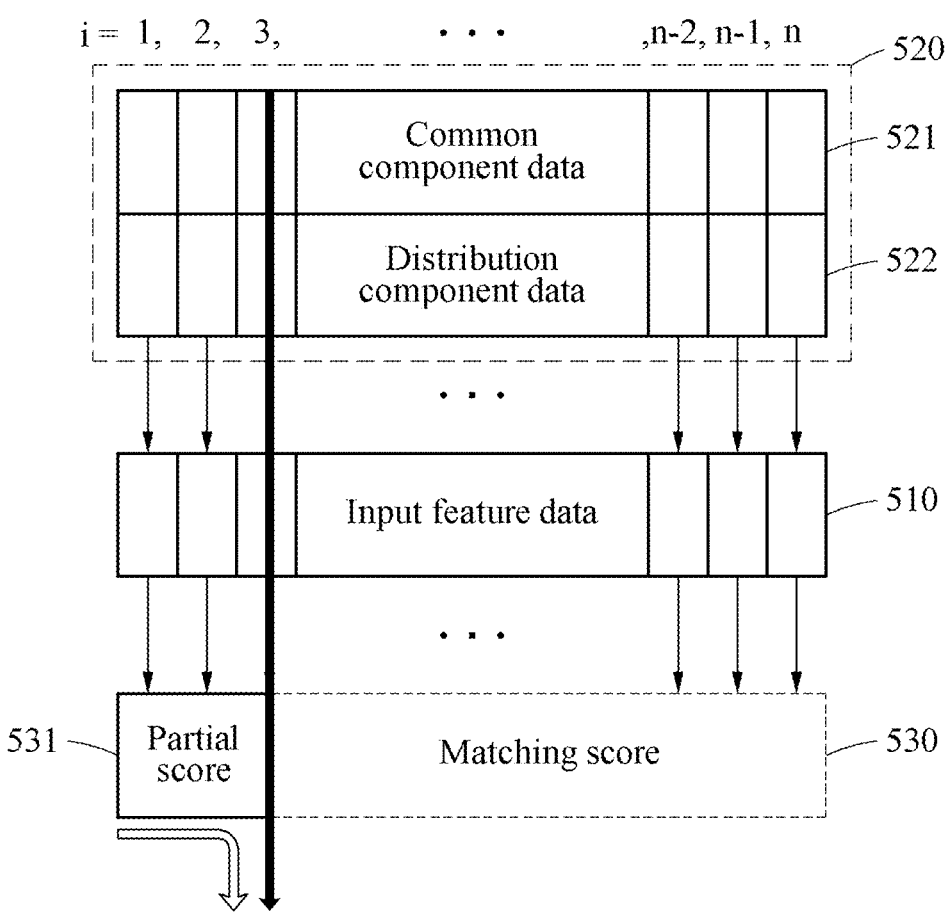
FIGS. 5 and 6 illustrate example processes of calculating a matching score and recognizing data.
Figure 6:
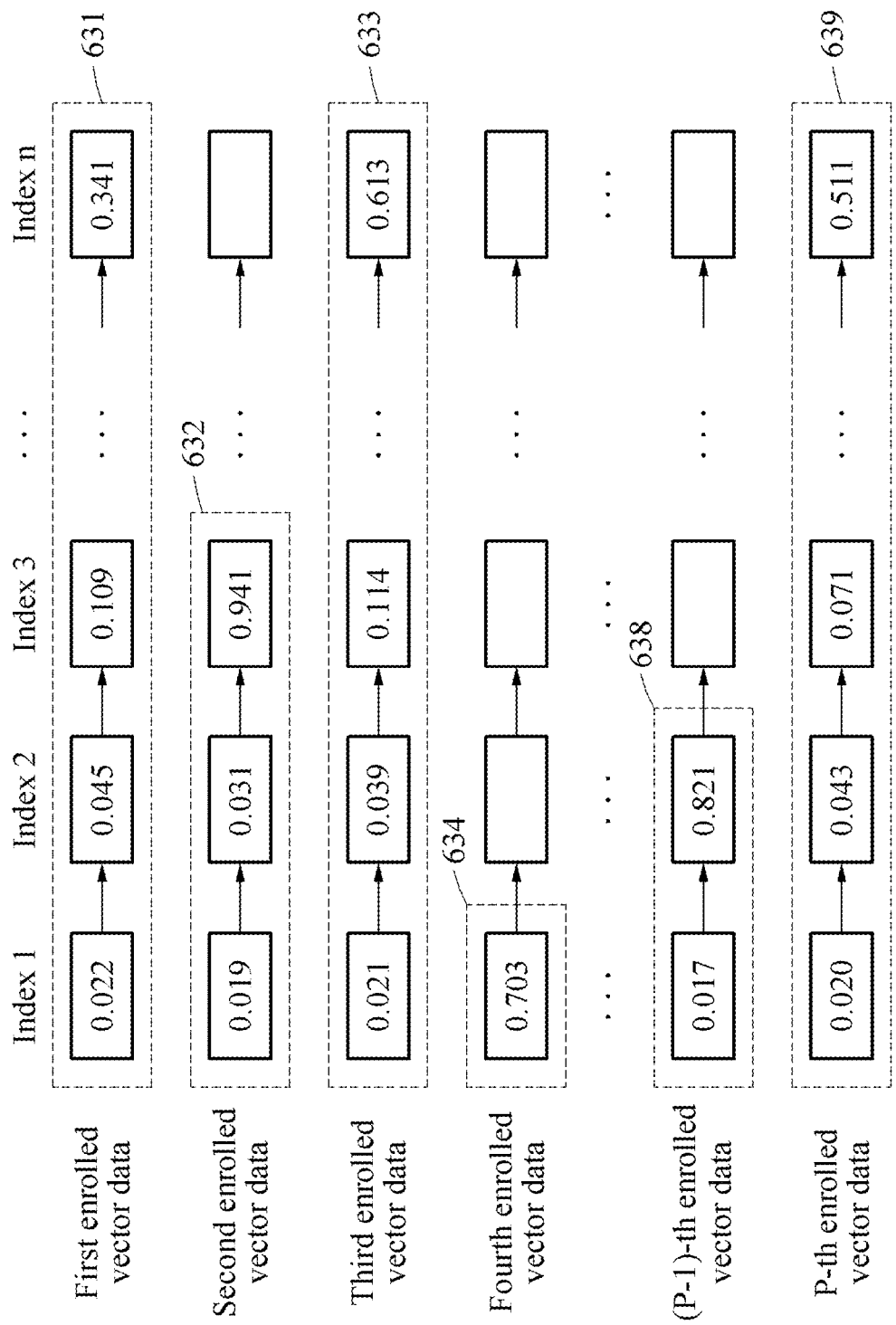

FIGS. 5 and 6 illustrate example processes of calculating a matching score and recognizing data.

Referring to FIG. 5, a data recognition device may calculate a partial score 531 as a matching score 530 from at least one entry of input feature data 510, at least one entry of common component data 521, and at least one entry of distribution component data 522. For example, the data recognition device calculates an entry score in a target index, for example, an i-th index, based on an entry corresponding to the target index in the input feature data 510, an entry corresponding to the target index in the common component data 521, and an entry corresponding to the target index in the distribution component data 522. The data recognition device calculates the partial score 531 by accumulating the entry score in the target index to an entry score in at least one other index. For example, the accumulating of the entry score in the target index to the entry score in at least one other index includes adding the entry score in the target index to the entry score in at least one other index.

For example, the term $(\mu_A - B)^T S_A^{-1}(\mu_A - B)$ in Equation 8 is a vector product or matrix product operation, and thus is expressed by Equation 14.

$$(\mu_A - B)^T S_A^{-1}(\mu_A - B) = \sum_{i=1}^{n}(\mu_{a,i} - b_i)^2 \cdot s'_{a,i} \qquad \text{Example 14:}$$

In Equation 14, $s'_{a,i}$ is an entry of $S_A^{-1}$ multiplied by an entry corresponding to an i-th index of $(\mu_A - B)^T$ or $(\mu_A - B)$. Unlike a cosine similarity, an operation of the matching similarity of Equation 8 with respect to an individual index is divided as expressed by Equation 15.

$$(\mu_{a,i} - b_i)^2 \cdot s'_{a,i} \qquad \text{Equation 15:}$$

Equation 15 represents the entry score in the i-th index. In the matching score operation according to Equation 8, the data recognition device separately calculates entry scores for individual indices, and thus calculates the partial score 531.

Thus, the data recognition device may calculate entry scores in many indices according to Equation 15, and may calculate the partial score 531 by adding up the calculated entry scores. For example, as shown in FIG. 5, the data recognition device calculates and accumulates entry scores while sequentially increasing an index. For example, as shown in FIG. 5, the data recognition device calculates an entry score with i corresponding to n by increasing i by 1 from an entry score with i corresponding to 1.

The input feature data 510, the common component data 521, and the distribution component data 522 include dimension vectors with the same dimension.

The data recognition device may recognize the input data based on the partial score 531 calculated with respect to a portion of indices of the dimension before scores with respect to all the indices of the dimension are calculated. For example, in FIG. 5, the data recognition device calculates the partial score 531 by calculating entry scores from entries of a mean feature vector, entries of a variance feature vector, and entries of an input feature vector corresponding to first to third indices according to Equation 15. In FIG. 5, the data recognition device compares the partial score 531 calculated up to the third index, among n indices, to a partial threshold value.

For reference, the partial threshold value is a threshold value set with respect to a predetermined target index to determine whether a recognition is successful with respect to a partial score obtained by accumulating entry scores up to the target index. The partial threshold value is set to be a value corresponding to a proportion of the target index to all the indices, in a total threshold distance value set with respect to all the indices. For example, when Th$_{distance\_total}$ is set for the total threshold distance value calculated with respect to all the n indices, a partial threshold distance value with respect to a partial score calculated up to the target index i is Th$_{distance\_total}$*i/n. However, this example is provided only for ease of description, and the partial threshold value may be set based on another proportion in other examples.

FIG. 6 illustrates an example process of determining whether input data matches a plurality of enrolled vector data. For example, a data recognition device determines whether the input data matches each enrolled vector data based on a result of comparing a partial score calculated for each index from the plurality of enrolled vector data to a partial threshold level.

For reference, the entry score of Equation 15 is a distance value. Thus, a smaller entry score indicates a higher similarity between an object of the input data and an enrolled user, and a greater entry score indicates a lower similarity between the object of the input data and the enrolled user. In an example in which a sum of entry scores is used as the partial score, a smaller partial score indicates a higher similarity between the object of the input data and the enrolled user, and a greater partial score indicates a lower similarity between the object of the input data and the enrolled user. Thus, the data recognition device compares the calculated partial score to a partial threshold level, and determines that the object of the input data does not match the enrolled user when the partial score exceeds the partial threshold level. Conversely, when the partial score is less than or equal to the partial threshold level, the data recognition device determines that the object of the input data matches the enrolled user. In FIGS. 5 and 6, an example in which the matching score, the entry score, and the partial score are distance values is described. However, although the entry score and the partial score are set to be distance values in FIGS. 5 and 6 for ease of description, the entry score and the partial score are not limited to being distance values. As another example, the entry score and the partial score may be set to be similarities. For example, to configure the partial score as a similarity, the partial score may be set to be a value obtained by subtracting a sum of the entry scores calculated according to Equation 15 from a predetermined constant, for example, "1".

The data recognition device may determine whether a recognition based on the input data is successful, based on a result of comparing the partial score to a partial success threshold level. Additionally, the data recognition device may determine whether the recognition based on the input data is failed, based on a result of comparing the partial score to a partial failure threshold level.

For example, the data recognition device calculates the partial score by sequentially calculating entry scores from an index 1 to index n and adding up the entry scores. However, examples are not limited to sequentially calculating from the index 1 to index n. The data recognition device may select an index in a predetermined order and calculate a partial score with respect to the selected index. In FIG. 6, the data recognition device calculates final matching scores with respect to first enrolled vector data 631, third enrolled vector data 633, and P-th enrolled vector data 639. In this example, P is an integer greater than or equal to "1".

For example, the data recognition device calculates 0.019 as an entry score in an index 1 of second enrolled vector data 632, calculates 0.012 as an entry score in an index 2, and calculates 0.910 as an entry score in an index 3. Thus, the data recognition device calculates 0.941 as a partial score with respect to the target index 3. For example, when it is assumed that a partial threshold distance value as a partial failure threshold level in the third index is 0.9, the partial score in the target index 3 exceeds the partial threshold distance value. Thus, the data recognition device determines that the second enrolled vector data 632 does not match the input feature data.

Similarly, for example, with respect to fourth enrolled vector data 634, the data recognition device calculates 0.703 as a partial score in an index 1. As an example, when it is assumed that a partial threshold distance value as a partial failure threshold level in the first index is 0.5, the data recognition device determines that the fourth enrolled vector data 634 does not match the input feature data. With respect to (P−1)-th enrolled vector data 638, the data recognition device calculates 0.821 as a partial score in an index 2, for example. When it is assumed that a partial threshold distance value as a partial failure threshold level in the second index is 0.7, for example, the data recognition device determines that the (P−1)-th enrolled vector data 638 does not match the input feature data.

In the above examples, only the partial failure threshold level is described. However, the disclosure herein is not limited to these examples. According to other examples, the partial success threshold level may also be set with respect to at least one index. In such examples, when the partial score calculated as a distance value is less than the partial success threshold level, the data recognition device determines that the input feature data matches the enrolled vector data.

Thus, the data recognition device may determine whether the input feature data matches the enrolled vector data by calculating partial scores up to a portion of indices, without calculating matching scores, for example, similarities or distance values, with respect to all the indices constituting a dimension with respect to a plurality of enrolled vector data, for example, P enrolled vector data in FIG. 6. Accordingly, the data recognition method and device may more quickly determine whether the input feature data matches the enrolled feature data, when the input feature data and the enrolled vector data are sufficiently similar or sufficiently dissimilar during the calculation, although the calculation is yet to be performed with respect to all the indices. Consequently, the data recognition device may quickly generate a recognition result with a low computing complexity. Furthermore, the data recognition method and device may also consider a distribution tendency of the enrolled feature vectors, and thus may provide a more accurate recognition than existing methods and devices that simply compare feature vectors.

For reference, an example in which the partial score is a distance value is described in FIG. 6. The partial score may be set to be a partial similarity such as a value obtained by subtracting a sum of the entry scores calculated according to Equation 15 from a predetermined constant, for example, "1". When the partial score is a partial similarity, the data recognition device may determine that a recognition is successful in response to the partial similarity in the target index exceeding the partial success threshold level, and, conversely, may determine that the recognition is failed in response to the partial similarity being less than the partial failure threshold level.

Figure 7:
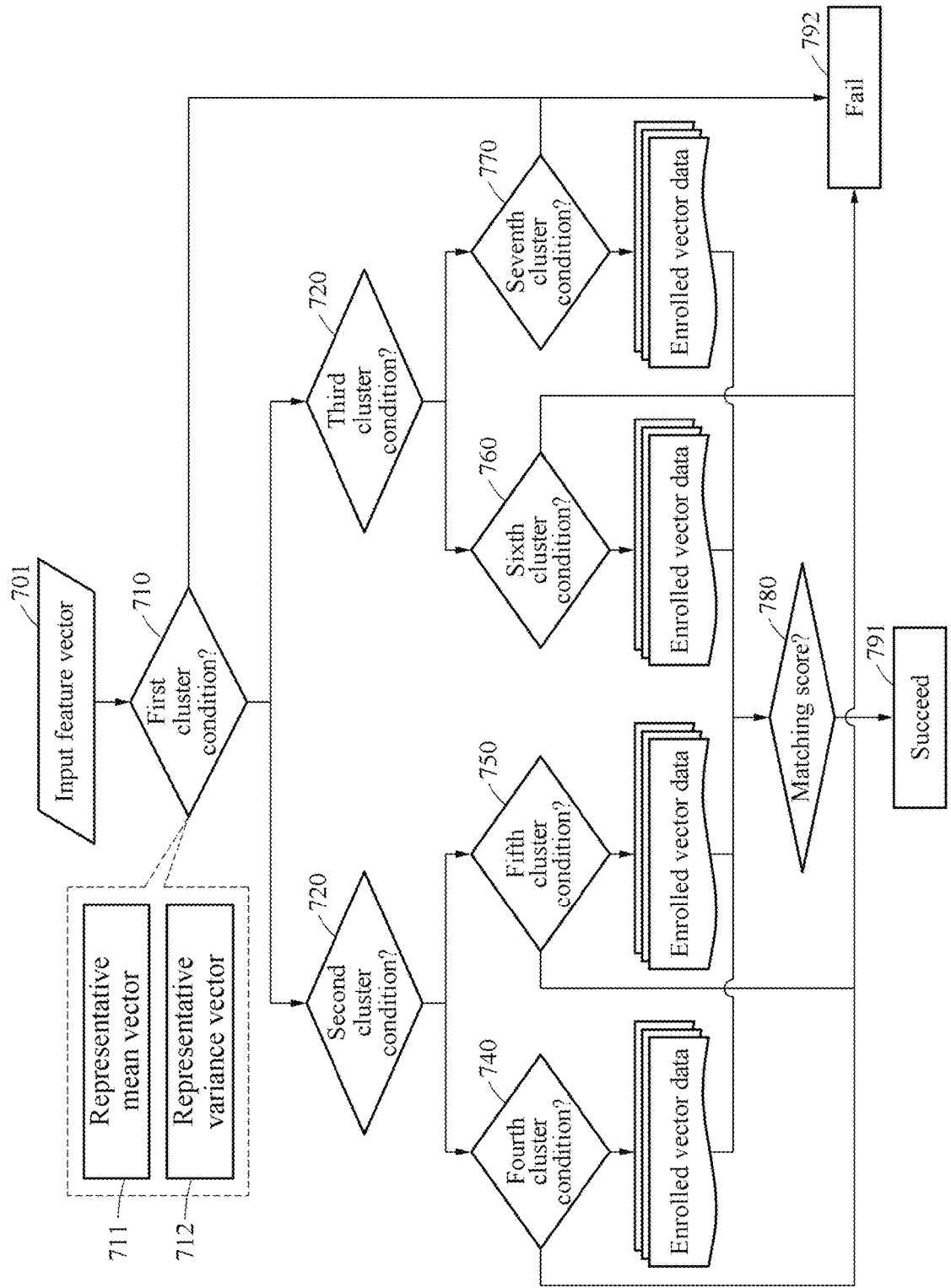
FIG. 7 illustrates an example process of recognizing data.

FIG. 7 illustrates an example process of recognizing data.

In an example, a data recognition device may load, from an enrollment database storing a plurality of enrolled vector data clustered into a plurality of groups, a representative mean vector and a representative variance vector corresponding to each of the plurality of groups. A representative mean vector and a representative variance vector corresponding to a target group are a mean vector and a variance vector of enrolled feature vectors belonging to the target group. For example, in FIG. 7, a first group is a root node, and a second group and a third group are child nodes of the first group/first root node. Representative mean vectors and representative variance vectors of the second group and the third group are mean vectors and distribution vectors of enrolled feature vectors of the respective groups. When the first group includes the second group and the third group, the representative mean vector and the representative variance vector of the first group are a mean vector and a distribution vector of all the enrolled feature vectors included in the two groups, the second group and the third group. Thus, the data recognition device may manage the enrolled feature vectors by grouping the enrolled feature vectors in a tree structure.

The data recognition device may identify a group to which the input feature data is matched, among the plurality of groups, based on the input feature data, the representative mean vector, and the representative variance vector. In the example of FIG. 7, the data recognition device may determine whether an input feature vector 701 satisfies a first cluster condition 710. The first cluster condition 710 indicates whether a matching score calculated from the input feature vector 701, a representative mean vector 711 of a first group, and a representative variance vector 712 of the first group exceeds a first group threshold similarity. The data recognition device may determine that the input feature vector 701 is matched to the first group in response to the calculated matching score exceeding the threshold similarity. Conversely, in response to the matching score being less than or equal to the threshold similarity, the data recognition device may determine that a verification with respect to the input feature vector 701 is failed, in operation 792.

The data recognition device may determine whether the input feature vector 701 identified as matched to the first group belongs to the second group and/or the third group in the first group based on a second cluster condition 720 and/or a third cluster condition 730. The second cluster condition 720 indicates whether a matching score calculated from the input feature vector 701, and a representative mean vector and a representative variance vector of the second group exceeds a second group threshold similarity. The third cluster condition 730 through a seventh cluster condition 770 are also set similarly. The data recognition device may calculate a matching similarity to the input feature vector 701 using a representative mean vector and a representative variance vector representing each group from a top hierarchy and a bottom hierarchy of the tree structure, and may finally identify a lowermost group to which the input feature vector 701 is matched based on a result of comparing the matching similarity to a group threshold value of each group.

The data recognition device determines whether the input data matches enrolled vector data belonging to the identified group. For example, in operation 780, the data recognition device may calculate a matching score to the input feature vector 701 using a mean feature vector and a variance feature vector of enrolled vector data belonging to the identified lowermost group. When the matching score is a similarity, the data recognition device may determine that a recognition is successful, in operation 791, in response to the matching score exceeding the threshold similarity as a result of comparing the matching similarity to the threshold similarity. Conversely, in response to the matching score being less than or equal to the threshold similarity, the data recognition device may determine that the recognition is failed, in operation 792.

For reference, an example in which each group has a single representative mean vector and a single representative variance vector is described above, for ease of description. However, the disclosure herein is not limited to such an example. P enrolled vector data are clustered such that each group has k representative mean vector and k representative variance vector. Here, k is an integer greater than or equal to "1". When N is 2, and P is 1000, the data recognition device detects enrolled vector data having a maximum similarity with respect to the input feature data through at most 20 ($\log_2 1000*2$) comparison operations, rather than measuring similarities with respect to all the 1000 vectors. Furthermore, the data recognition device identifies a search direction of a lower group node through a partial score with respect to a portion of indices, rather than a calculation with respect to all the indices in a calculating process through a combination with the methods described in FIGS. 5 and 6.

Figure 8A:
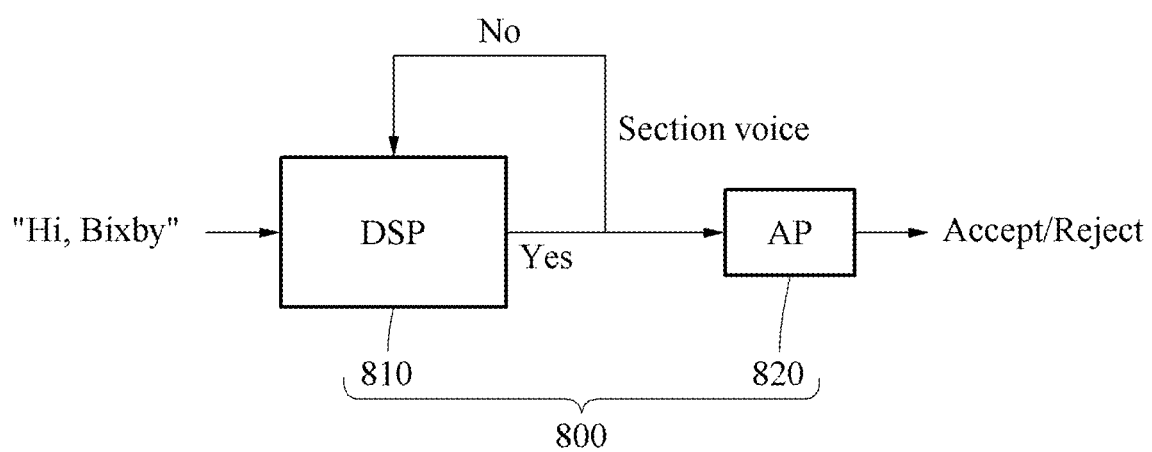
FIGS. 8A through 8C illustrate example configurations of processors.
Figure 8B:
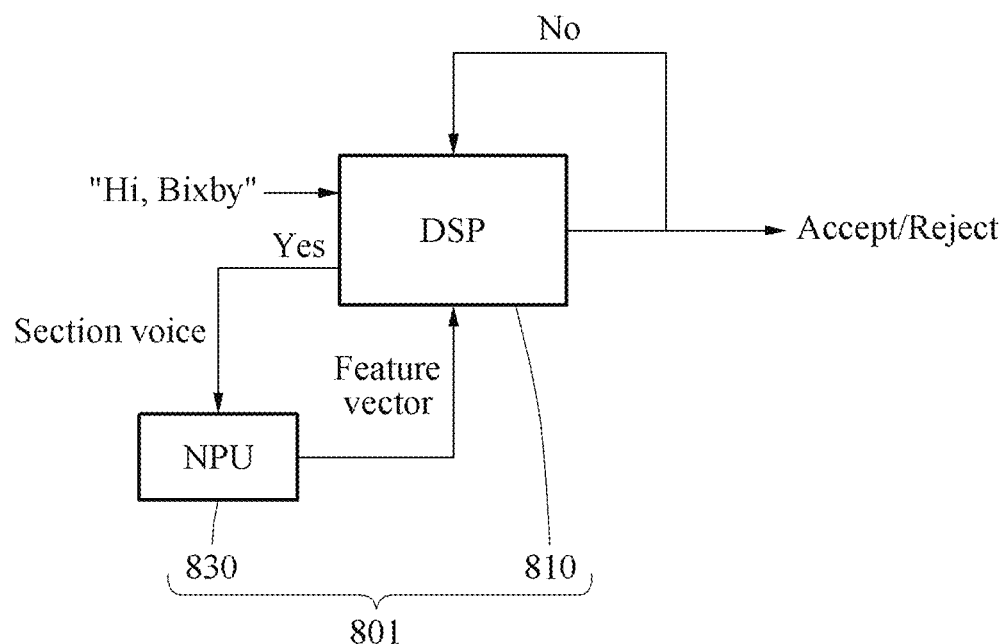
Figure 8C:
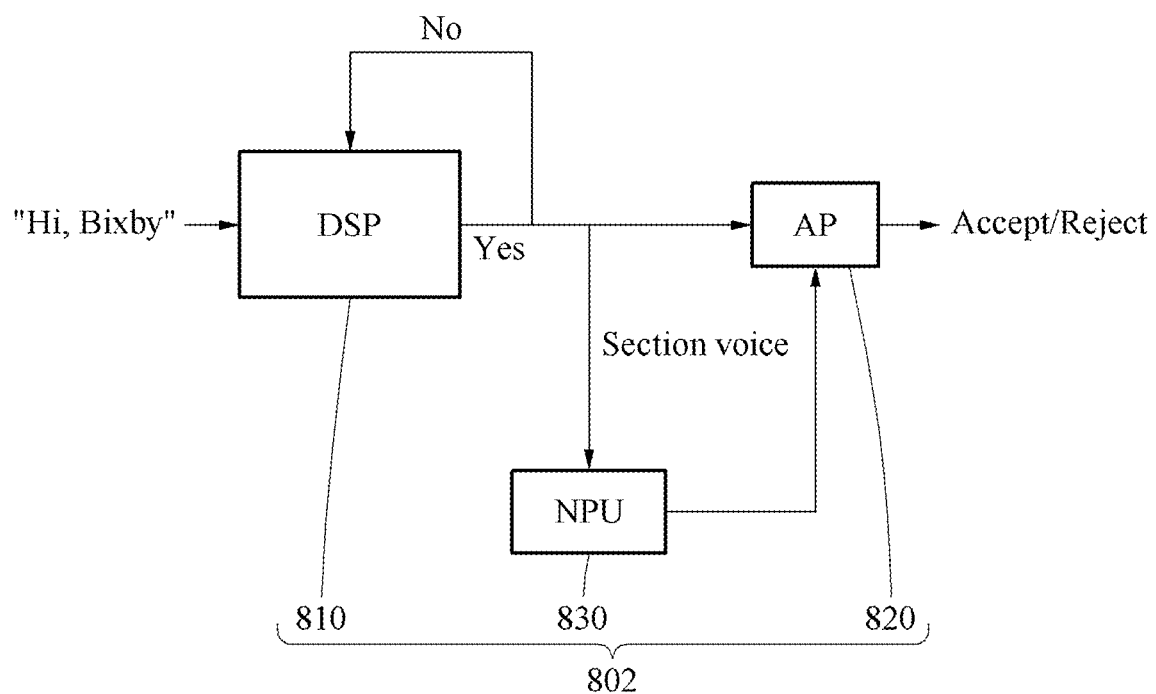

FIGS. 8A through 8C illustrate example configurations of processors.

Processors implemented in various structures are described with reference to FIGS. 8A through 8C. A data recognition device recognizes an image and/or a voice through the processors implemented in various structures. For example, a processor of the data recognition device may receive an input image as input data from a user. The processor may extract input feature data from the input image. The processor may determine whether an object in the input image is an enrolled user based on a matching score. In another example, the processor may receive a voice signal as input data from a speaker. The processor may extract input feature data from the voice signal. The processor determines whether the speaker of the voice signal is an enrolled user based on a matching score. FIGS. 8A through 8C illustrate examples of processors receiving a voice signal as input data.

In FIG. 8A, a processor 800 may include a digital signal processor (DSP) 810 and an application processor (AP) 820. For example, the AP 820 operates as a main processor. For example, the DSP 810 detects target data from input data. As shown in FIG. 8A, the DSP 810 may detect a section voice signal, for example, keywords such as "Hi, Bixby", of a predetermined pattern. The DSP 810 may transmit the detected target data to the AP 820. The DSP 810 may operate at low power and thus, may always remain activated. Further, the DSP 810 may roughly determine whether a speaker is an enrolled user. The AP 820 may extract input feature data from the target data. The AP 820 may calculate a matching score from the extracted input feature data and enrolled vector data, and may determine whether to accept or reject an access of the user indicated by the target data. For reference, the AP 820 may operate in a sleep mode, and may be activated in response to the target data being received from the DSP 810.

In FIG. 8B, a processor 801 may include a neural processing unit (NPU) 830 and the DSP 810. The DSP 810 may operate as a main processor. The NPU 830 may be configured to extract input feature data. For example, the NPU 830 receives a voice signal of a keyword section as input data from the DSP 810, and extracts the input feature data from the received section voice signal. The DSP 810 may monitor whether a keyword voice is input from the user by monitoring the voice signal. The DSP 810 may also always remain activated. Further, the DSP 810 may be configured to calculate a matching score from the input feature data, common component data, and distribution component data received from the NPU 830. The DSP 810 may determine whether to accept and/or reject an access to the device by determining whether the user of the input data matches an enrolled user based on the matching score. For reference, the NPU 830 may be implemented as an exclusive processor configured to perform the operation of the neural network described with reference to FIG. 1.

In FIG. 8C, a processor 802 may include the DSP 810, the AP 820, and the NPU 830. Similar to the description provided with reference to FIG. 8A, the DSP 810 may detect target data including a voice of a keyword section from an input voice signal, and may transmit the detected target data to the AP 820 and the NPU 830. The NPU 830 may extract input feature data from the target data corresponding to the section voice. The AP 820 may operate in a sleep mode, and may be activated in response to a keyword being detected by the DSP 810. The AP 820 may calculate a matching score based on the input feature data and enrolled vector data received from the NPU 830. The AP 820 may determine whether to allow an access of a user based on the calculated matching score.

For reference, in the examples of FIGS. 8A through 8C, the AP 820 may be a chip designed to have a relatively high computing performance and a relatively great power consumption, in comparison to the DSP 810. However, the disclosure herein is not limited to these examples.

The data recognition device may allow the access to the device in response to a determination that the user indicated by the input data matches the enrolled user. Herein, allowing an access is an operation of assigning the user an authority on at least one function and/or application of the device. For example, when a recognition is successful and the device is locked, the data recognition device unlocks the device.

Figure 9:
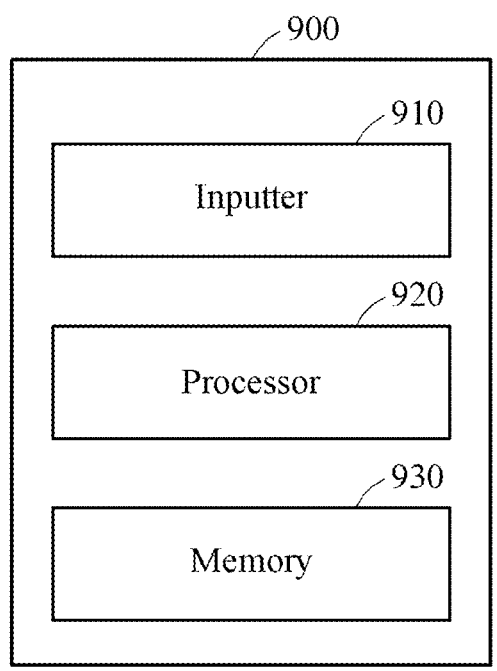
FIGS. 9 and 10 illustrate example configurations of data recognition devices.
Figure 10:
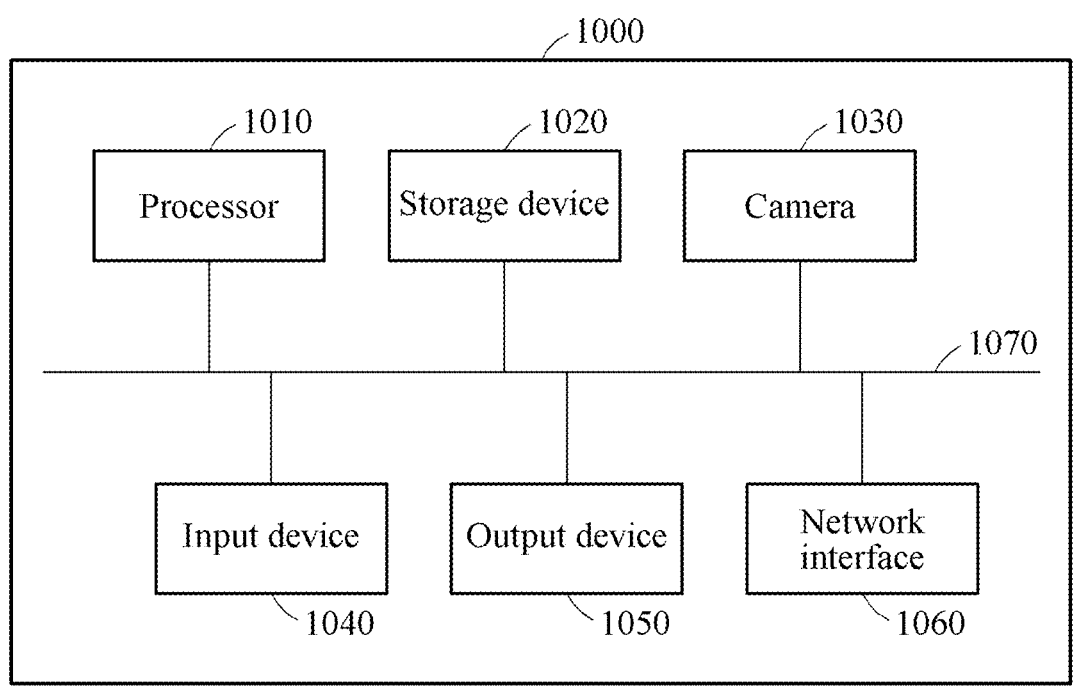

FIGS. 9 and 10 illustrate example configurations of data recognition devices.

Referring to FIG. 9, a data recognition device 900 includes an inputter 910, a processor 920, and a memory 930.

The inputter 910 receives input data. For example, the inputter 910 receives an input image and/or an input voice as the input data. In an example, the inputter 910 may include a camera configured to capture an image. In another example, the inputter 910 may include a microphone configured to capture a voice signal. In another example, the input device may include a camera and a microphone.

The processor 920 may extract input feature data from the input data. The processor 920 may calculate a matching score from the input feature data, and common component data and distribution component data of a plurality of enrolled feature data corresponding to an enrolled user. The processor 920 may recognize the input data based on the matching score. However, an operation of the processor 920 is not limited to the foregoing description, and may be performed in a time series manner or in parallel with at least one of the operations described above with reference to FIGS. 1 through 8.

The memory 930 may store an enrollment database including the plurality of enrolled vector data clustered into a plurality of groups. The memory 930 may store enrolled vector data including a mean feature vector and a variance feature vector of a plurality of enrolled feature vectors, rather than storing many enrolled feature vectors one by one, thereby reducing a storage space. However, the memory 930 is not limited to such an example. The memory 930 may temporarily or permanently store data required for performing a data recognition method.

In FIG. 10, a computing device 1000 is a data recognition device that uses the data recognition method described above. The computing device 1000 may correspond to the device 900 of FIG. 9. The computing device 1000 may be, for example, an image processing device, a smart phone, a wearable device, a tablet computer, a netbook, a laptop, a desktop, a personal digital assistant (PDA), or a head mounted display (HMD).

Referring to FIG. 10, the computing device 1000 may include a processor 1010, a storage device 1020, a camera 1030, an input device 1040, an output device 1050, and a network interface 1060. The processor 1010, the storage device 1020, the camera 1030, the input device 1040, the output device 1050, and the network interface 1060 communicate with each other through a communication bus 1070.

The processor 1010 executes instructions and functions to be executed in the computing device 1000. For example, the processor 1010 may perform instructions stored in the storage device 1020. The processor 1010 may perform the at least one operation described with reference to FIGS. 1 through 9.

For example, storage device 1020 may store information or data required for execution of the processor 1010. The storage device 1020 may include a computer-readable storage medium or a computer-readable storage device. The storage device 1020 stores instructions to be executed by the processor 1010, and may store related information while an application or software is executed by the computing device 1000.

The camera 1030 captures an image including a plurality of image frames. For example, the camera 1030 generates a frame image.

The input device 1040 may receive an input from a user through a haptic, video, audio, or touch input. The input device 1040 may include a keyboard, a mouse, a touch screen, a microphone, or another predetermined device that detects the input from the user and transmits the detected input.

The output device 1050 may provide an output of the computing device 1000 to the user through a visual, auditory, or haptic channel. The output device 1050 may include, for example, a display, a touch screen, a speaker, a vibration generator, or another predetermined device that provides the output to the user. The network interface 1060 may communicate with an external device through a wired or wireless network. The output device 1050 may provide the user with a result of recognizing the input data, for example, access allowance and/or access rejection, using at least one of visual information, auditory information, and haptic information.

The neural networks, the neural networks 100 and 350, the processors, the processors 800, 801, 802, 920, and 1010, the memories, the memory 930, the data recognition device 900, the computing device 1000, the DSP 810, the AP 820, the NPU 830, the inputter 910, the storage device 1020, the input device 1040, the output device 1050, the network interface 1060, and the communication bus 1070 in FIGS. 1-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with data recognition, comprising:
   extracting input feature data from input data;
   calculating a matching score between the extracted input feature data and enrolled feature data of an enrolled user, by calculating a partial score based on a determined portion less than an entirety of the extracted input feature data, a determined portion less than an entirety of common component data of a plurality of the enrolled feature data, and a determined portion less than an entirety of distribution component data of the plurality of the enrolled feature data; and
   recognizing the input data based on the matching score.

2. The method of claim 1, wherein the common component data includes a mean feature vector having an entry corresponding to a mean value of entries with a same index, among entries of the plurality of enrolled feature data, for each index among indices, and
  wherein the distribution component data includes a variance feature vector having an entry corresponding to a variance value of the entries with the same index, among the entries of the plurality of enrolled feature data, for each index.

3. The method of claim 1, wherein the calculating of the matching score comprises calculating the partial score as the matching score from at least one entry of the extracted input feature data, at least one entry of the common component data, and at least one entry of the distribution component data.

4. The method of claim 3, wherein the calculating of the partial score comprises:
  calculating an entry score in a target index based on an entry corresponding to the target index in the extracted input feature data, an entry corresponding to the target index in the common component data, and an entry corresponding to the target index in the distribution component data; and
  calculating the partial score by accumulating the entry score in the target index to an entry score in at least one other index.

5. The method of claim 4, wherein the accumulating of the entry score in the target index to the entry score in the at least one other index comprises adding the entry score in the target index to the entry score in the at least one other index.

6. The method of claim 3, wherein the extracted input feature data, the common component data, and the distribution component data include dimension vectors with a same dimension, and
  wherein the recognizing of the input data comprises recognizing the input data based on the partial score calculated with respect to a portion of indices of the dimension, before scores with respect to all the indices of the dimension are calculated.

7. The method of claim 3, wherein the recognizing of the input data comprises:
  determining whether a recognition based on the input data is successful, based on a result of comparing the partial score to a partial success threshold level; or
  determining whether the recognition based on the input data is failed, based on a result of comparing the partial score to a partial failure threshold level.

8. The method of claim 1, wherein the recognizing of the input data comprises allowing an access to a device, in response to determining that a user indicated by the input data matches the enrolled user.

9. The method of claim 1, wherein the calculating of the matching score comprises:
  loading a representative mean vector and a representative variance vector corresponding to each of a plurality of groups, from an enrollment database storing a plurality of enrolled vector data clustered into the plurality of groups;
  identifying a group to which the extracted input feature data is matched, among the plurality of groups, based on the extracted input feature data, the representative mean vector, and the representative variance vector; and
  determining whether the input data matches enrolled vector data belonging to the identified group,
  wherein the plurality of enrolled vector data each include common component data and distribution component data.

10. The method of claim 1, wherein the receiving of the input data comprises receiving an input image from a user as the input data,
  wherein the extracting of the input feature data comprises extracting the input feature data from the input image, and
  wherein the recognizing of the input data comprises determining whether an object in the input image corresponds to the enrolled user based on the matching score.

11. The method of claim 1, wherein the receiving of the input data comprises receiving a voice signal from a speaker as the input data,
  wherein the extracting of the input feature data comprises extracting the input feature data from the voice signal, and
  wherein the recognizing of the input data comprises determining whether the speaker of the voice signal corresponds to the enrolled user based on the matching score.

12. A non-transitory computer-readable storage medium storing instructions that, when executed by a processor, cause the processor to perform the method of claim 1.

13. A device with data recognition, comprising:
  an inputter configured to receive input data; and
  one or more processors configured to:
    extract input feature data from the input data;
    calculate a matching score between the extracted input feature data and enrolled feature data of an enrolled user, by calculating a partial score based on a determined portion less than an entirety of the extracted input feature data, a determined portion less than an entirety of common component data of a plurality of the enrolled feature data, and a determined portion less than an entirety of distribution component data of the plurality of the enrolled feature data; and
    recognize the input data based on the matching score.

14. The device of claim 13, wherein the one or more processors are further configured to calculate the partial score as the matching score from at least one entry of the extracted input feature data, at least one entry of the common component data, and at least one entry of the distribution component data.

15. The device of claim 14, wherein the one or more processors are further configured to calculate an entry score in a target index based on an entry corresponding to the target index in the extracted input feature data, an entry corresponding to the target index in the common component data, and an entry corresponding to the target index in the distribution component data, and calculate the partial score by accumulating the entry score in the target index to an entry score in at least one other index.

16. The device of claim 15, wherein the accumulating of the entry score in the target index to the entry score in the at least one other index comprises adding the entry score in the target index to the entry score in the at least one other index.

17. The device of claim 14, wherein the extracted input feature data, the common component data, and the distribution component data include dimension vectors with the same dimension, and
  the one or more processors are further configured to recognize the input data based on the partial score calculated with respect to a portion of indices of the dimension, before scores with respect to all the indices of the dimension are calculated.

18. The device of claim 14, wherein the one or more processors are further configured to determine whether a recognition based on the input data is successful, based on a result of comparing the partial score to a partial success threshold level, or determine whether the recognition based on the input data is failed, based on a result of comparing the partial score to a partial failure threshold level.

19. The device of claim 13, wherein the one or more processors are further configured to allow an access to a device, in response to a determination that a user indicated by the input data matches the enrolled user.

20. The device of claim 13, further comprising:
a memory storing an enrollment database including a plurality of enrolled vector data clustered into a plurality of groups,
wherein the plurality of enrolled vector data each include common component data and distribution component data, and
wherein the one or more processors are further configured to:
load a representative mean vector and a representative variance vector corresponding to each of the plurality of groups from the memory;
identify a group to which the extracted input feature data is matched, among the plurality of groups, based on the extracted input feature data, the representative mean vector, and the representative variance vector; and
determine whether the input data matches enrolled vector data belonging to the identified group.

21. The device of claim 13, wherein the one or more processors comprise:
a neural processing unit (NPU) configured to extract the input feature data; and
a main processor configured to calculate the matching score from the extracted input feature data, the common component data, and the distribution component data upon receiving the extracted input feature data, the common component data, and the distribution component data from the NPU.

22. The device of claim 13, wherein the one or more processors comprise:
a digital signal processor (DSP) configured to detect target data from the input data; and
a main processor configured to extract the input feature data from the target data.

23. The device of claim 13, wherein the inputter comprises either one of a camera configured to receive an input image as the input data and a microphone configured to receive an input voice as the input data.

24. A processor-implemented method with data recognition, comprising:
extracting input feature data from input data;
calculating a partial matching score between the extracted input feature data and enrolled feature data of an enrolled user, based on the extracted input feature data, a portion of common component data of a plurality of enrolled feature data corresponding to the enrolled user, and a portion of distribution component data of the plurality of enrolled feature data corresponding to the enrolled user; and
recognizing the input data based on the partial matching score,
wherein the portion of the common component data is less than an entirety of entries of the common component data, and the portion of the distribution component data is less than an entirety of entries of the distribution component data.

25. The method of claim 24, wherein the extracted input feature data comprises an input feature vector, the common component data comprises a mean feature vector, and the distribution component data comprises a variance feature vector.

26. The method of claim 24, wherein the recognizing of the input data comprises determining whether a user inputting the input data corresponds to the enrolled user based on the partial matching score.

* * * * *